United States Patent
Gronau et al.

(10) Patent No.: US 6,854,550 B2
(45) Date of Patent: Feb. 15, 2005

(54) METHOD OF IMPROVING THE CONTROL RESPONSE OF AN AUTOMATIC SLIP CONTROL SYSTEM

(75) Inventors: Ralph Gronau, Wetter (DE); Burkhard Sappok, Weisenheim am Berg (DE); Gerold Schneider, Langgöns-Niederkleen (DE); Roland Caspari, Frankfurt (DE)

(73) Assignee: Continental Teves AG & Co., Ohg, Frankfurt (DE)

( * ) Notice: Subject to any disclaimer, the term of this patent is extended or adjusted under 35 U.S.C. 154(b) by 0 days.

(21) Appl. No.: 10/399,438
(22) PCT Filed: Oct. 4, 2001
(86) PCT No.: PCT/EP01/11445
§ 371 (c)(1),
(2), (4) Date: Sep. 12, 2003
(87) PCT Pub. No.: WO02/32732
PCT Pub. Date: Apr. 25, 2002

(65) Prior Publication Data
US 2004/0059492 A1 Mar. 25, 2004

(30) Foreign Application Priority Data
Oct. 17, 2000 (DE) .......................................... 100 51 828

(51) Int. Cl.⁷ ................................................ B60T 8/28
(52) U.S. Cl. ......................................... 180/197; 701/74
(58) Field of Search ................................. 180/197, 233; 701/71, 89, 74

(56) References Cited

U.S. PATENT DOCUMENTS

| | | | | |
|---|---|---|---|---|
| 4,538,700 A | * | 9/1985 | Suzuki | 180/248 |
| 5,169,215 A | * | 12/1992 | Takata | 303/113.4 |
| 5,249,849 A | * | 10/1993 | Sakata | 303/190 |
| 5,332,298 A | * | 7/1994 | Fujioka | 303/20 |
| 5,365,444 A | * | 11/1994 | Suzuki et al. | 701/74 |
| 5,423,601 A | | 6/1995 | Sigl | |
| 5,559,702 A | * | 9/1996 | Kojima et al. | 701/74 |
| 5,566,094 A | | 10/1996 | Kojima et al. | |
| 6,023,649 A | * | 2/2000 | Matsuura et al. | 701/71 |
| 6,122,585 A | * | 9/2000 | Ono et al. | 701/71 |
| 6,324,461 B1 | * | 11/2001 | Yamaguchi et al. | 701/80 |

FOREIGN PATENT DOCUMENTS

| | | |
|---|---|---|
| DE | 19527531 | 2/1996 |
| EP | 0496252 | 7/1992 |
| EP | 1013523 | 6/2000 |

* cited by examiner

Primary Examiner—Avraham Lerner
(74) Attorney, Agent, or Firm—Honigman Miller Schwartz and Cohn LLP

(57) ABSTRACT

A method of improving the control performance of a traction slip control system so that faulty control activations of the TCS control system are prevented in critical situations such as driving downhill. The invention concerns a method wherein a vehicle reference speed and a vehicle deceleration signal are derived from the rotational behavior of the vehicle wheels and wherein a vehicle deceleration signal is obtained by way of a longitudinal deceleration sensor. The course of the two deceleration signals is compared and analyzed for detecting stable or unstable wheel rotational behavior. Preferably a difference signal is formed indicating the difference between the two deceleration signals. The difference signal is evaluated by a multistage filter arrangement.

8 Claims, 3 Drawing Sheets

METHOD OF IMPROVING THE CONTROL RESPONSE OF AN AUTOMATIC SLIP CONTROL SYSTEM

The present invention relates to a method of improving the control performance of a traction slip control system by preventing or reducing control errors or faulty control activations in a situation critical with respect to faulty control activations such as when driving downhill. The method is provided especially, but not exclusively, for all-wheel driven vehicles. A method is concerned wherein a vehicle reference speed and a vehicle deceleration signal are derived from the rotational behavior of the individual vehicle wheels and wherein a vehicle deceleration signal is obtained by means of a longitudinal deceleration sensor.

WO 98/16838 discloses a method of determining vehicle deceleration or acceleration from the wheel sensor signals of a slip control system.

As is known, a special problem with all-wheel driven vehicles is to produce the vehicle reference speed because there is no reliable, secured information about the current vehicle speed which can be derived from the wheels because principally all wheels can be acted upon by drive torque and, thus, may be exposed to traction slip. This fact renders it necessary to take into account secondary signals, such as signals derived from the engine torque (with gear step information), or include an acceleration sensor in order to determine the vehicle acceleration. The signals obtained this way, however, represent the actually prevailing conditions or the actually prevailing driving situation only inappropriately because the influence of the downgrade force or the inclination cannot be taken into consideration. In practice, this fact causes a vehicle reference speed at an unjustified low rate, with the possible effect of faulty control activations of the traction slip control system, i.e., commencement of the TCS control in spite of stably running wheels.

Therefore, an object of the present invention is to develop a method of improving the control performance of a traction slip control system that permits reliably preventing faulty control activations in situations of the above-mentioned type.

It has shown that this object may be achieved by a method of improving the control performance of a traction slip control system, wherein a vehicle reference speed and a vehicle deceleration signal can be derived from the rotational performance of the individual vehicle wheels and wherein a vehicle deceleration signal may be produced by means of a longitudinal deceleration sensor, the special features of said method involving that the variations of the two deceleration signals, that is the deceleration signal derived from the wheel rotational behavior and the deceleration signal produced by means of the longitudinal deceleration sensor, are compared and analyzed for detecting stable or unstable wheel rotational behavior. When stable wheel rotational behavior is identified, an unjustified commencement of the control system, i.e., of traction slip control, can be avoided in the above-mentioned situation because a too low vehicle reference speed is raised or approximated to the actual wheel rotational speeds, respectively.

The falsification of the signal originating from the longitudinal deceleration sensor (B sensor) due to a downgrade is the cause for possible faulty control activations in conventional control systems when driving downhill. This is because the longitudinal deceleration signal is reduced by a value corresponding to the downgrade.

The theoretically maximum possible vehicle acceleration (in the plane) derived from the engine torque and the gear step no longer represents the top limit value when driving downhill because the acceleration corresponding to the downgrade force must be added. This possible additional acceleration, caused by the downgrade force, cannot be considered by a corresponding offset because otherwise it would not be possible to detect in time an unstable wheel rotational behavior on roadways with a low coefficient of friction.

In a favorable embodiment of the method of the invention, a signal is produced for comparing and analyzing the deceleration signals, said signal representing the difference between the deceleration signal derived from the wheel rotational behavior and the deceleration signal produced by means of the longitudinal deceleration sensor. The time variation of the difference signal may now be evaluated for identifying stable or unstable wheel rotational behavior.

According to another embodiment of the invention, the difference signal between said two deceleration signals is produced by means of a multistage filter arrangement. Said filter arrangement comprises a first low-pass filter having a limit frequency of 1 to 3 hertz and, therefore, being referred to as slow filter in the following. Besides, a second low-pass filter is provided having a limit frequency of approximately 4 to 10 hertz and, therefore, being referred to as (comparatively) fast filter. The variation and the amplitude of the output signals of these two low-pass filters are compared and evaluated for the detection of unstable or stable wheel run. In this arrangement, it has proven favorable to evaluate a deviation of the signal obtained with the second filter from the signal obtained with the first filter, which deviation lies within a predetermined tolerance range, as an indication of a stable rotational behavior of the vehicle wheels, while exceeding of the tolerance range is regarded as an indication of an unstable wheel run.

This tolerance range indicating a stable wheel rotational behavior when preserved is formed by presetting a tolerance band according to the present invention. The tolerance limits are achieved in positive and negative deviation by parallel lines spaced from each other by roughly±0.02 g to 0.1 g, especially of±0.05 g ('g' implying the gravitational acceleration constant).

Further details of the present invention can be taken from the following explanation of embodiments by way of the accompanying drawings. In the drawings, FIG. 1 is a schematically simplified view of some variables describing the vehicle behavior or driving performance and the control sequence in a situation that is relevant for the method of the invention.

Figure 1:
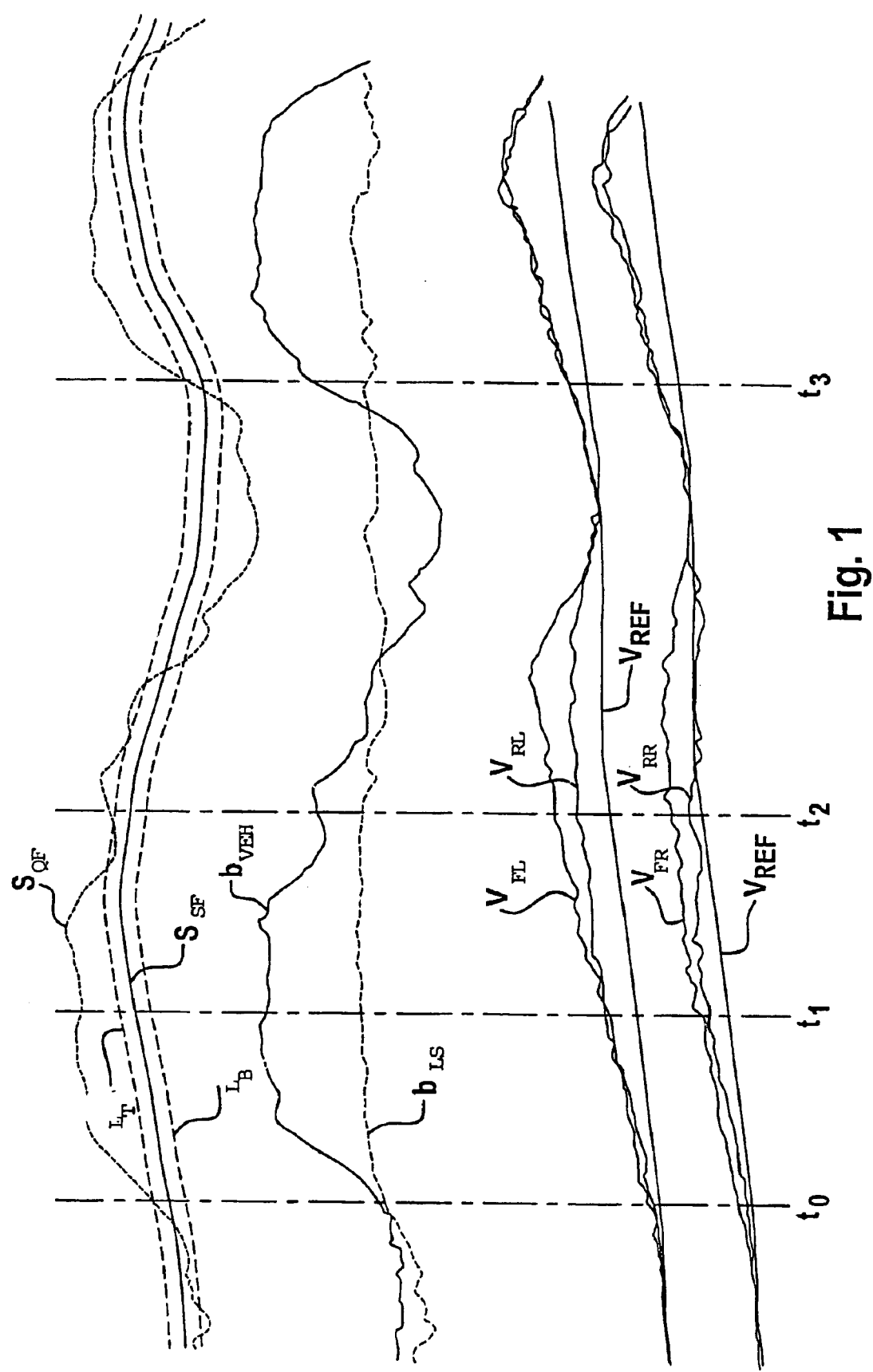

Referring to FIG. 1 some signal variations during a short time of some seconds are shown, said signal variations depicting a situation critical for faulty control activations and being especially appropriate to explain the mode of operation and the operating sequence of the method of the invention.

$V_{FL}$, $V_{RL}$, $V_{FR}$, and $V_{RR}$ designate the wheel sensor signals representing the variation of the speeds of the individual vehicle wheels in the situation under review. Further, a vehicle reference speed $V_{REF}$ is shown which, as is known, can be determined on the basis of the rotational speeds of the individual wheels and serves as a reference variable for the control.

Therefore, the method of the invention is based on comparing and analyzing deceleration signals produced in different ways. FIG. 1 depicts the course of a B sensor signal, i.e., the output signal of a vehicle longitudinal deceleration sensor (B sensor), and the course of a vehicle deceleration signal that was derived from the rotational behavior of the individual wheels.

The two deceleration signals $b_{LS}$ and $b_{VEH}$ which the B sensor supplies and which are derived from the wheel sensor signals are compared to one another. A difference signal S is produced which is evaluated according to the invention after having passed a filter arrangement for detecting stable and unstable wheel run.

The filter arrangement is composed of a first and a second low-pass filter in the embodiment described herein. The limit frequency of the first low-pass filter, hereinbelow referred to as 'slow filter', ranges in the magnitude of 1 to 3 hertz in the example described herein, while the limit frequency of the second low-pass filter, the 'quick filter', ranges in the magnitude of 4 to 10 hertz. This way a relatively slowly changing difference signal $S_{SF}$ and also a signal $S_{QF}$ indicating the quicker changes is produced. $S_{QF}$ is shown in dotted lines, $S_{SF}$ in a solid line in FIG. 1.

The deviation of the signal $S_{QF}$ produced by means of the quick filter from the signal $S_{SF}$ produced by the slow filter furnishes an indication or hint at the stability of the vehicle wheels. In the embodiment of FIG. 1, a tolerance band around the difference signal $S_{SF}$ produced with the first low-pass filter is achieved by an offset of e.g.±0.05 g. This tolerance band forms a top and a bottom limit $L_T$ or $L_B$, respectively, for the 'quick signal' $S_{QF}$ in relation to the 'slow signal' $S_{SF}$. As will still be explained in detail in the following by way of FIGS. 2 and 3, a 'stable' wheel run is assumed according to the invention only as long as the 'quick' signal $S_{QS}$ extends within the tolerance limits $L_T$, $L_B$. When the 'quick' difference signal $S_{QF}$ exceeds the tolerance limits $L_B$, $L_T$, this is an indication of instabilities, that means 'unstable' wheel run, so that TCS control can be allowed (the reference speed is not corrected).

In the example of FIG. 1, the difference signal $S_{QF}$ produced by means of the quick filter rises in excess of the top limit value $L_O$ at time $t_o$. Previously the wheel rotational behavior was stable, for what reason the variation of the wheel speeds $V_{FL}$, $V_{RL}$, $V_{FR}$, and $V_{RR}$ and of the vehicle reference speed $V_{REF}$ differed from one another at most slightly. The difference signal $S_{QF}$ exceeding the top limit value $L_T$ of the tolerance range at time $t_o$ is an indication of unstable wheel run or unstable wheel rotational behavior. Subsequent to $t_o$—as is shown in the wheel speed characteristic curves in the bottom part of FIG. 1—the vehicle reference speed $V_{REF}$ is not corrected so that roughly at the point of time $t_1$ a traction slip control operation (TCS control) may be initiated due to excessive wheel slip, too high wheel acceleration, etc. The signals, especially the difference signal $S_{QF}$ delivered by the quick filter indicate unstable wheel rotational behavior, for what reason the commencement of TCS control would not be a 'faulty' control activation.

It becomes apparent from the further course of the deceleration signals and the difference signals that the stability of the wheel run is initially enhanced by the TCS control, followed by new unstable phases, roughly at the points of time $t_2$ and $t_3$, which cause the difference signal $S_{QF}$ produced by means of the quick filter to leave the tolerance band ($L_T/L_B$) again.

Figure 2:
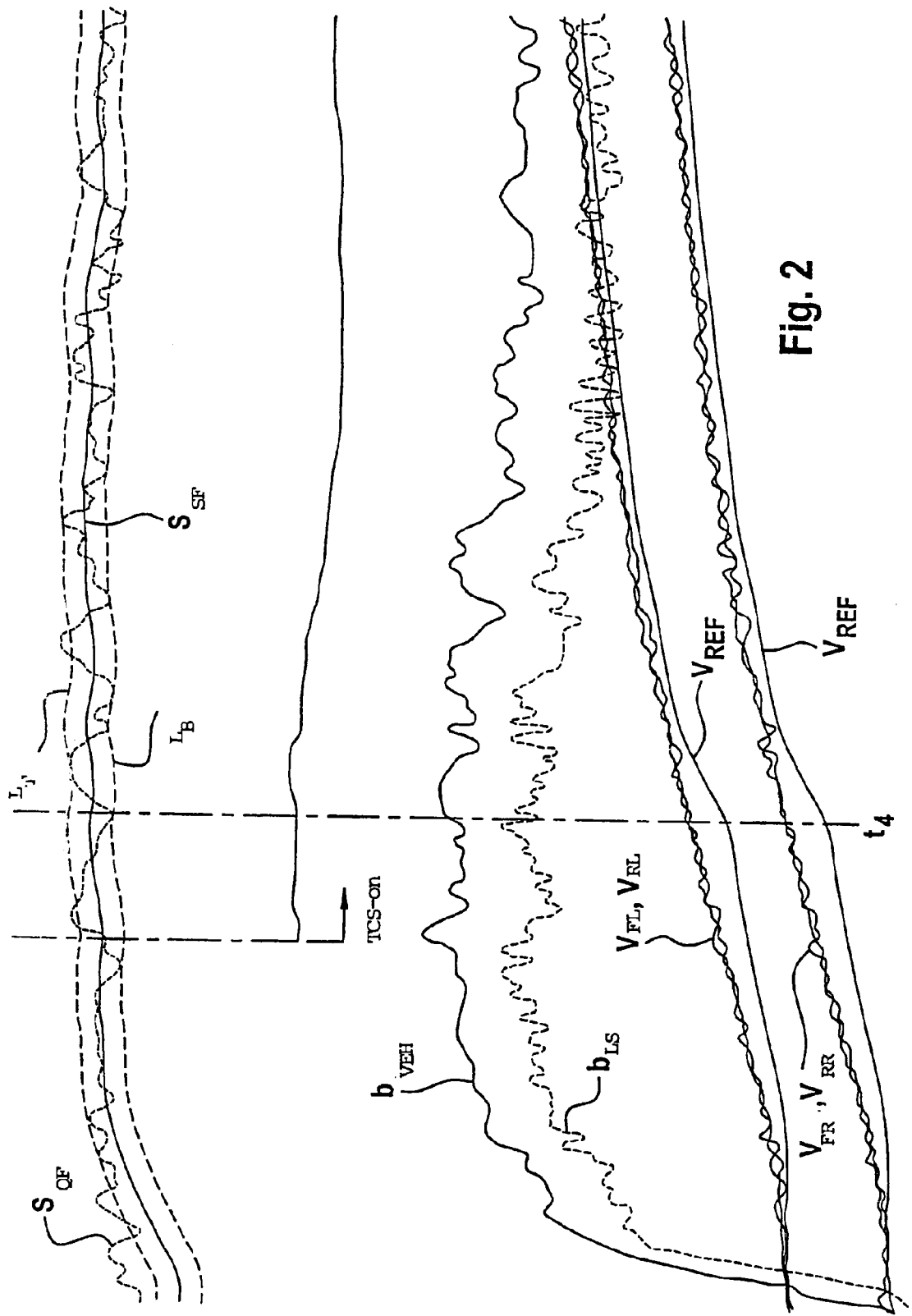
FIG. 2 shows the same signals in a situation with stable wheel rotational behavior in a similar way of illustration like FIG. 1.
Figure 3:
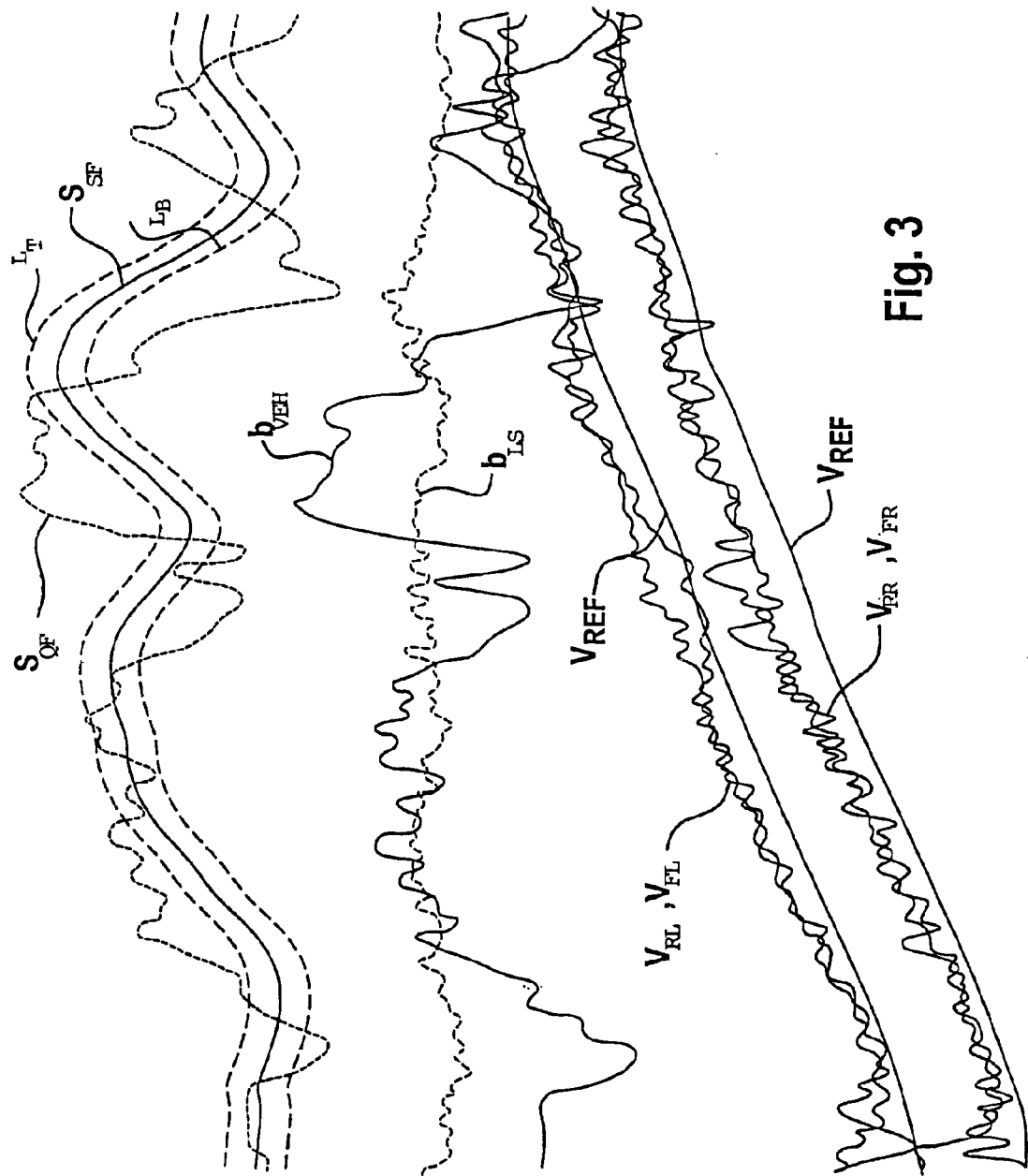
FIG. 3 shows the same variables as in FIGS. 1 and 2 in a situation with unstable wheel rotational behavior in a similar way of illustration.

FIGS. 2 and 3 show further sections of the control procedure by depicting calibration curves obtained in different situations.

FIG. 2 relates to driving downhill with an all-wheel driven vehicle with a consistently stable wheel run. The wheel speeds $V_{FL}$, $V_{RL}$, as well as $V_{FR}$, and $V_{RR}$ depicted in the bottom curves can hardly be distinguished. The vehicle reference speed $V_{REF}$ is increased at time $t_4$ to a relatively strong degree in the embodiment of FIG. 2 and is thereby approximated to the wheel speeds $V_{FL}$, $V_{RL}$, $V_{FR}$, $V_{RR}$. The deceleration signals $b_{VEH}$—meaning the vehicle deceleration signal derived from the wheel rotational behavior and the deceleration signal $b_{LS}$ produced by means of the longitudinal deceleration sensor—take a relatively 'similar' course, at a defined distance though. The difference between the two deceleration signals $b_{VEH}$ and $b_{LS}$ is due to the additional deceleration caused by downhill driving or the downgrade, said deceleration reducing the signal produced with the longitudinal force sensor by an approximately constant amount corresponding to the downgrade. The difference signal $S_{SF}$ produced by the slow filter and the tolerance band or the tolerance range predetermined by the parallel lines $L_T$ and $L_B$ extending in relation to the difference signal $S_{SF}$ are shown in the top part of FIG. 2. The course of the signal $S_{QF}$ produced by means of the quick filter is essentially within the tolerance band. Consequently, the indications in this situation hint at a 'stable' run of all vehicle wheels.

In addition, FIG. 2 shows a signal 'TCS-on' which would lead to faulty control activation in the illustrated situation. In this case the TCS control activation could be initiated by the deviation of the vehicle reference speed from the wheel speeds at the time $t_{TCS-on}$ if this had not been detected by the invention method as imminent faulty control activation and eliminated.

The wheel rotational behavior is undoubtedly unstable in the situation shown in FIG. 3. This cannot be detected or at least identified without doubt by analyzing the variation of the wheel speeds $V_{FL}$, $V_{RL}$, $V_{FR}$, $V_{RR}$. The course of the vehicle longitudinal deceleration $b_{LS}$ and the vehicle deceleration $b_{VEH}$ derived from the wheel rotational behavior is in no way 'similar', what is in contrast to these two variables in the situation of FIG. 2. The 'slow' difference signal $S_{SF}$ with the associated tolerance range limits $L_T$ and $L_B$ differs greatly in points from the variation of the difference signal $S_{QF}$ obtained by means of the quick filter. This alone would be a strong indication of an unstable wheel run or unstable wheel rotational behavior. In addition, it can be seen from FIG. 3 that the gradient of the difference signal $S_{LF}$ changes to a relatively strong degree in the period under review which likewise points to an unstable wheel rotational behavior. The vehicle reference speed is not corrected in the situation according to FIG. 3. The commencement of a traction slip control operation in this situation is not influenced or prevented by the method of the invention.

Thus, the method of the invention shows a way that renders it possible to make a distinction between unstable wheel rotational behavior and stable wheel rotational behavior in situations critical for a TCS control system, especially in downhill driving. The invention method avoids faulty control activation in such a situation and thereby permits transmission of the full driving torque to the wheels. The result of faulty control activation in such a situation would be an undesirable, unpleasant and in some cases even dangerous reduction of the drive.

What is claimed is:

1. Method of improving the control performance of a traction slip control system (TCS system) by preventing or reducing control errors or faulty control activations, comprising the steps of:

collecting a vehicle reference speed from the rotational behavior of the individual vehicle wheels, collecting a vehicle deceleration signal by means of a longitudinal deceleration sensor (B sensor), calculating a vehicle deceleration value from said wheel rotational behavior, comparing and analyzing said value calculated from said rotational behavior of the individual vehicle wheels with said deceleration signal produced by means of the longitudinal deceleration sensor (B sensor), for detecting stable or unstable wheel rotational behavior, wherein a signal is produced for comparing and analyzing the deceleration signals, said signals representing the difference between the deceleration signal derived from the wheel rotational behavior and the deceleration signal produced by means of the longitudinal deceleration sensor (B sensor).

2. Method as claimed in claim 1, wherein a time variation of said difference signal is evaluated for identifying stable or unstable wheel rotational behavior.

3. Method as claimed in claim 1, wherein said difference signal is evaluated by means of a multistage filter arrangement.

4. Method as claimed in claim 3, wherein said multistage filter arrangement includes a first low-pass filter having a limit frequency in the order of 1 to 3 hertz and at least one second low-pass filter having a limit frequency in the order of 4 to 10 hertz, and in that the variation of the signals obtained by means of the low-pass filters are compared and evaluated for the detection of unstable or stable wheel rim.

5. Method as claimed in claim 3, wherein said multistage filter arrangement includes a first low-pass filter having a limit frequency in the order of 1 to 3 hertz and at least one second low-pass filter having a limit frequency in the order of 4 to 10 hertz, and in that the amplitude of the signals obtained by means of the low-pass filters are compared and evaluated for the detection of unstable or stable wheel run.

6. Method as claimed in claim 4, wherein a deviation of the signal obtained with the second filter from the signal obtained with the first, which deviation lies within a predetermined tolerance range, is evaluated as an indication of a stable rotational behavior of the vehicle wheels, while exceeding of the tolerance range is regarded as an indication of an unstable wheel run.

7. Method as claimed in claim 6, wherein the tolerance range, that indicates a stable wheel rotational behavior when preserved, is formed by presetting a tolerance band in the order of 0.02 g to 0.1 g with respect to the signal obtained with the first filter, with 'g' implying the gravitational acceleration constant.

8. Method as claimed in claim 1, wherein the vehicle reference speed is corrected or raised and thereby approximated to the actual rotational speed of the wheels when a stable wheel rotational behavior is detected.

* * * * *

UNITED STATES PATENT AND TRADEMARK OFFICE
CERTIFICATE OF CORRECTION

PATENT NO.    : 6,854,550 B2
DATED         : February 15, 2005
INVENTOR(S)   : Gronau et al.

It is certified that error appears in the above-identified patent and that said Letters Patent is hereby corrected as shown below:

Column 5,
Line 14, change "said signals representing the" to -- said signal representing the --.

Column 6,
Line 2, change "or stable wheel rim" to -- or stable wheel run --.
Line 12, change "with the first, which" to -- with the first filter, which --.

Signed and Sealed this

Seventh Day of June, 2005

JON W. DUDAS
*Director of the United States Patent and Trademark Office*